United States Patent
Hunsinger

[15] 3,668,558
[45] June 6, 1972

[54] SURFACE WAVE INTERFERENCE MODULATOR

[72] Inventor: Billy Jo Hunsinger, Urbana, Ill.

[73] Assignee: The Magnovox Company, Fort Wayne, Ind.

[22] Filed: Dec. 11, 1969

[21] Appl. No.: 884,097

[52] U.S. Cl................................332/7.51, 350/161, 356/112
[51] Int. Cl...........................................................H01s 3/00
[58] Field of Search.....................332/7.51; 350/161, 163; 356/112

[56] References Cited

UNITED STATES PATENTS

| | | | |
|---|---|---|---|
| 3,498,693 | 3/1970 | Fein et al. | 350/161 X |
| 2,155,661 | 4/1939 | Jeffree | 350/161 X |
| 3,327,243 | 6/1967 | Stickley | 332/7.51 X |
| 3,365,579 | 1/1968 | Emshwiller | 332/7.51 X |

*Primary Examiner*—Benjamin A. Borchelt
*Assistant Examiner*—N. Moskowitz
*Attorney*—Richard T. Seeger

[57] ABSTRACT

The specification discloses an apparatus for modulating light in which a interferometer of the multiple reflection or multiple transmission type is employed. The interferometer has a pair of spaced optically flat reflective surfaces on at least one of which Rayleigh waves are excited The excited surface may be formed on a piezoelectric member and the Rayleigh waves excited thereon by supplying voltage pulsations to a grid mounted on the surface to be excited.

7 Claims, 5 Drawing Figures

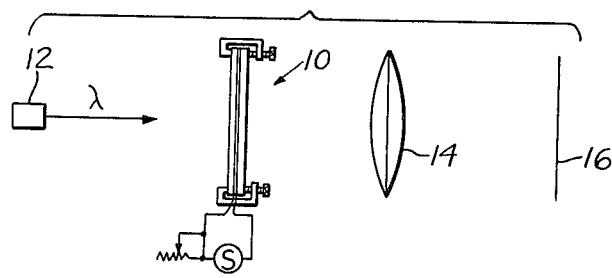
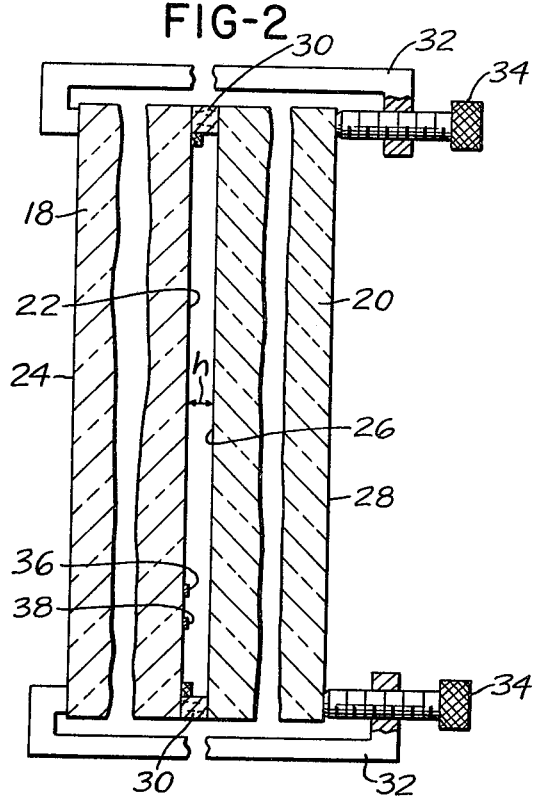
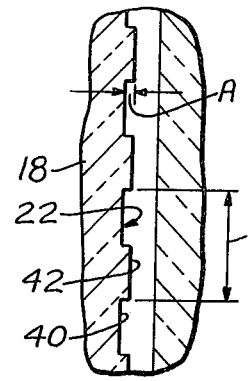
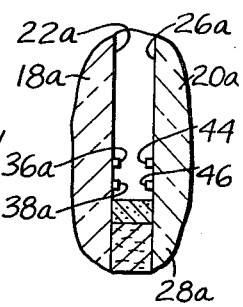
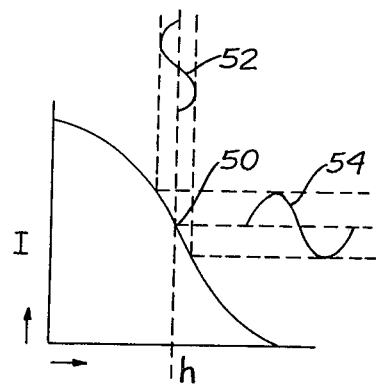
INVENTOR.
BILLY JO. HUNSINGER
ATTORNEYS

SURFACE WAVE INTERFERENCE MODULATOR

BRIEF SUMMARY OF THE INVENTION

The present invention employs an interferometer, such as a Fabry-Perot interferometer, with an arrangement for exciting surface waves, namely, Rayleigh waves, on at least one of the opposed reflective faces of the interferometer. The invention contemplates a relatively wide range of frequency of the waves from about 10 megahertz up to about 500 megahertz and, furthermore, contemplates variation in the amplitude of the waves. The waves referred to are established, as mentioned, on at least one of the opposed faces of the interferometer thereby creating a series of corrugations in the surface which changes the distance between the opposed faces of the interferometer and thereby changes the modulating characteristics of the interferometer.

The present invention relates to apparatus utilizing interferometers and, in particular, to apparatus utilizing multiple reflection, or multiple transmission, interferometers such as Fabry-Perot interferometers, and to a method of operation thereof.

Interferometers of the type referred to are well known and comprise a pair of light transmitting plates arranged in closely spaced parallel relation with the opposite surfaces of each plate optically flat. The opposed faces of the respective plates are reflectively coated to a degree such that light entering the interferometer from one side will pass back and forth between the reflectively coated surfaces with a portion passing therethrough at each reflection of the light. By collecting the light passing through the interferometer and emerging therefrom on the side opposite the source of light with a condensing lens, interference patterns can be established in the focal plane of the lens.

Interferometers of the Fabry-Perot type are, described above, relatively efficient in operation and are, therefore, preferred for the practice of the present invention.

The present invention is concerned with a fundamental modification of a multiple reflection or multiple transmission interferometer, especially of the Fabry-Perot type, such that the range of utility of the interferometer is greatly expanded and use thereof is permitted for carrying out operations which heretofore could not be accomplished by the use of an interferometer.

In particular, the present invention proposes the provision of a novel apparatus embodying the elements of a multiple reflection or multiple transmission interferometer and useful for spatially modulating beams of light, in particular, coherent light, for solid state beam steering, laser beam modulation, optical signal processing, coherent detection, and spectrum compression systems. The device according to the present invention can be used in any system requiring spatially modulated light under any circumstances that known spatial modulators can be employed as well as having a degree of flexibility and fields of use not within the range of other modulators.

It is known to control the operation of light interference devices by the use of acoustical power. Such power has been employed for establishing bulk waves in light transmitting members and for influencing the light transmitting quality of films and the like. SUch devices have, however, required high power levels and have been severely limited, for example, as to band width.

From the foregoing, it will be apparent that a primary objective of the present invention is the provision of an apparatus for spatially modulating light which is more flexible than any heretofore known spatial modulator.

Another object is the provision of an apparatus for spatially modulating light under the control of acoustic power which requires less power than heretofore known devices of this nature and which is substantially more efficient than heretofore known spatial modulators.

The foregoing objects as well as other objects and advantages of the present invention will become more apparent upon reference to the following specification, taken in connection with the accompanying drawings, in which:

FIG. 1 schematically illustrates a typical apparatus according to the present invention;

FIG. 2 is a vertical sectional view through the interferometer portion of the apparatus of FIG. 1 modified in accordance with the present invention;

FIG. 3 is a diagrammatic view showing, in part, how the apparatus of FIG. 2 operates;

FIG. 4 is a fragmentary view showing a modification; and

FIG. 5 is an explanatory graph.

DETAILED DESCRIPTION

Referring to the drawings more in detail, in FIG. 1, a Fabry-Perot interferometer is indicated at 10 and a source of light is shown on one side thereof at 12. On the other side of the interferometer is a condensing lens 14 with a screen 16 disposed at the focal plane of the lens.

The interferometer is shown more in detail in FIG. 2 wherein it will be seen to comprise a pair of light transmitting plates 18 and 20. Plate 18 has a first face 22 and a second face 24 and plate 20 has a first face 26 and a second face 28. Faces 22 and 26 are reflectively coated, as by silvering, to a degree such that from about 90 percent to about 98 percent of the light incident thereon will be reflected with the remainder of the light passing through the surface. The outer faces 24 and 28 of the plates are preferably provided with antireflective coatings of a known nature to eliminate light reflection therefrom. Both faces of each plate are optically flat and precisely parallel to each other.

The plates 18 and 20 are mounted with the reflective faces 22 and 26 in spaced parallel relation separated by a distance indicated at $h$ and which is on the order of from about 0.5 microns to about 25.0 microns. The plates are held in accurately spaced relation by the spacer members 30 against which the plates are clamped by the clamping yokes 32. Screws 34 can be availed of for adjusting the spacing between the plates and to this end the spacer means 30 is preferably somewhat resilient.

According to the present invention, an arrangement is provided for establishing surface waves on at least one of the opposed faces 22, 26 of plates 18 and 20. One highly effective manner of accomplishing this is to form plate 18 of a piezoelectric material and then mounting on face 22 thereof, preferably near one side edge, an electrically conductive grid in the form of spaced electrodes 36 and 38. When a voltage difference is established between the electrodes, a stress will be set up in the piezoelectric material causing physical movement thereof in the region of the electrodes.

By supplying voltage pulses to electrodes 36 and 38 repetitively, surface waves can be established on face 22 which will propogate thereacross thereby creating a corrugated pattern on surface 22. This is illustrated in FIG. 3 wherein it will be seen that face 22 has a plurality of valleys 40 and a plurality of peaks 42 which schematically represent the surface waves established thereon by the supply of voltage pulses to electrodes 36 and 38. For the sake of simplicity, the waves in FIG. 3 are shown as square waves.

The particular wave length of the surface waves, indicated at W in FIG. 3 will depend, of course, upon the frequency of the supply of voltage pulses to electrodes 36 and 38. Also the differences in height between the peaks 42 and the valleys 40, and indicated by dimension A in FIG. 3, will depend upon the amplitude of the voltage pulses supplied to the electrodes. Thus, by regulating the frequency and amplitude of the supply of voltage pulses to electrodes 36 and 38, both of the dimensions W and A can be varied.

It will be evident that the establishing of the surface waves on face 22 of plate 18 adjusts the distance $h$ between surfaces 22 and 26 and thereby materially affects the modulating characteristics of the interferometer. Since wave lengths of light are extremely short, the dimensions W and A referred to are quite small. In particular, dimension A may be only a few Angstrom units. Furthermore, since the Rayleigh waves referred to are a surface phenomenon and are confined to the immediate region of face 22, only a relatively small amount of power, a few milliwatts, is required to establish usable surface waves on the surface of the interferometer plate.

It will also be apparent that face 22 takes on the characteristics of a grating when the surface waves are established thereon and that variations in dimension W and in dimension A will have a pronounced effect on the modulating characteristics of the interferometer when face 22 is excited with Rayleigh waves.

Assuming that light source 12 supplies monochromatic light, preferably collimated, or coherent, the nature, i.e., the frequency and amplitude of the voltage pulsations supplied to electrodes 36 and 38 can be determined by the pattern that falls on screen 16. Similarly, with the frequency and magnitude of the supply of voltage pulses to electrodes 36 and 38 known, the pattern on screen 16 can be used to determine the characteristics of the light passing through the interferometer. In this manner, either the light passing through the interferometer or the supply of energy to the electrodes can be processed and analyzed and this will be accomplished continuously and instantaneously. The apparatus is, nevertheless, quite simple and relatively inexpensive.

The apparatus above described describes the establishing of surface waves on only one of the opposed faces of the two plates but it will be evident that the faces of both of the plates can be excited if desired. For example, as shown in FIG. 4, face 22a of plate 18a has electrodes 36a and 38a forming a grid thereon while surface 26a of plate 28a has electrodes 44 and 46 forming a grid thereon which, when energized as described above, will establish surface waves on the respective face.

The provision of means for exciting surface waves on both of the opposite faces of the interferometer plates introduces a degree of freedom and versatility never before possible with modulators of this nature.

The modulator can be biased so that the transfer function has a large nonlinear component. Then, with two signal sources for the respective means for developing surface waves on the opposed faces of the interferometer plates, cross correlation can be performed within a single modulator. Heretofore known conventional methods required two modulators operating in series to accomplish cross correlation. With two modulators in series, an extremely weak modulated beam of from 40 to 60 decibels less in intensity than the original incident beam results because each modulator will normally increase the beam strength by 20 to 30 decibels.

The interferometer of the present invention can be employed as part of a laser cavity and nearly all of the output light will be contained in the modulated beam.

Furthermore, light can be passed through the interferometer in either, or both, directions.

In operation, the plates of the interferometer are adjusted as to spacing so as to transmit about 50 percent of the light incident thereon. Then, when one of the opposed faces of the interferometer has waves excited thereon, the maximum variation in the rate of light transmission will be accomplished.

FIG. 5 is a graph showing the light transmitted as the ordinate I. The abscissa of the graph represents the spacing, $h$, between the opposed faces of the interferometer. The vertical dashed line 50 shows the point at which about one half of the maximum amount of light is transmitted. Directly above the graph, drawn on the extension of line 50, is a line 52 schematically representing the surface waves established on the excited face of the interferometer. To the right of the graph at 54 is plotted the variations in light brought about by the surface waves.

It will be evident that the invention could also be adapted to interferometers of the Lummer-Gehrcke type, although the Fabry-Perot type is preferred.

What is claimed is:

1. In an apparatus for processing light, an interferometer comprising:
    first and second plates having respective optically flat first surfaces in adjacent opposed parallel relation and each said first surface having a reflective coating thereon, said first and second plates having respective second surfaces, each said second surface having an anti-reflective coating thereon;
    exciting means mounted on one of said first surfaces and operable when actuated for exciting surface waves on said one first surface; and
    wave energy absorbing means mounted on said one first surface at the limits of the region thereof to be excited to prevent reflection of the surface waves at the edges of the plate.

2. An apparatus according to claim 1 in which said support means includes means for adjusting the spacing between said plates thereby to adjust the length of the path between the respective first faces of said plates.

3. In an apparatus for processing light; an interferometer comprising:
    first and second plates having respective optically flat first surfaces in adjacent opposed parallel relation and each said first surface having a reflective coating thereon, said first and second plates having respective second surfaces substantially parallel to their corresponding first surfaces and each said second surface having an anti-reflective coating thereon;
    exciting means mounted on at least one of said first surfaces and operable when actuated for exciting surface waves on the said first surface; and wherein
    said at least one first surface plate is piezoelectric in nature and said exciting means is in the form of electrically conductive grid means mounted on the said first surface near one limit of the region of the said first surface which is to be excited.

4. An apparatus according to claim 3 in which at least said first plate is strongly piezoelectric.

5. An apparatus according to claim 3 in which said grid comprises spaced first and second electrode, a source of pulsating voltage, and means connecting said first and second electrode to respectively opposite sides of said source of pulsating voltage.

6. In an apparatus for processing light; an interferometer comprising:
    first and second plates having respective optically flat first surfaces in adjacent opposed parallel relation and each said first surface having a reflective coating thereon, said first and second plates having respective second surfaces substantially parallel to their corresponding first surfaces and each said second surface having an anti-reflective coating thereon;
    a source of collimated monochromatic light on one side of said interferometer;
    a screen on the other side of said interferometer; and
    condensing lens means between said interferometer and said screen.

7. The method of modulating light which comprises:
    passing the light through an interferometer of the multiple reflection type having a pair of spaced parallel optically flat reflective surfaces, at least one of said surfaces being formed on a piezoelectric member, and exciting surface waves on at least one of said surfaces by mounting a grid on said at least one surface and supplying voltage pulsations to said grid to excite the said waves on said surface.

* * * * *